United States Patent [19]

Schlichting

[11] Patent Number: 5,374,297
[45] Date of Patent: Dec. 20, 1994

[54] LANCE FOR FUEL AND OXYGEN INJECTION INTO SMELTING OR REFINING FURNACE

[75] Inventor: Mark R. Schlichting, Chesterton, Ind.

[73] Assignee: Steel Technology Corporation, Washington, D.C.

[21] Appl. No.: 151,007

[22] Filed: Nov. 12, 1993

Related U.S. Application Data

[62] Division of Ser. No. 722, Jan. 5, 1993.

[51] Int. Cl.$^5$ .................. C22B 15/00; C21C 5/32
[52] U.S. Cl. ......................... 75/528; 75/508; 75/544; 75/548; 75/550; 266/217; 266/225
[58] Field of Search .............. 75/508, 528–530, 75/548, 550, 544; 266/217, 225

[56] References Cited

U.S. PATENT DOCUMENTS

| | | | |
|---|---|---|---|
| 2,991,173 | 7/1961 | Trentini | 75/544 |
| 3,615,356 | 10/1971 | Grenfell | 75/529 |
| 3,653,877 | 4/1972 | Enya | 75/529 |
| 3,832,161 | 8/1974 | Leroy | 75/529 |
| 3,844,768 | 10/1974 | Leroy | 75/529 |
| 4,434,005 | 2/1984 | Metz et al. | 75/60 |
| 4,533,124 | 8/1985 | Mercatoris | 266/225 |

Primary Examiner—Peter D. Rosenberg
Attorney, Agent, or Firm—Fitzpatrick, Cella, Harper & Scinto

[57] ABSTRACT

A furnace 10 for smelting iron ore and/or refining molten iron 20 is equipped with an overhead pneumatic lance 40, through which a center stream of particulate coal 53 is ejected at high velocity into a slag layer 30. An annular stream of nitrogen or argon 51 enshrouds the coal stream. Oxygen 52 is simultaneously ejected in an annular stream encircling the inert gas stream 51. The interposition of the inert gas stream between the coal and oxygen streams prevents the volatile matter in the coal from combusting before it reaches the slag layer. Heat of combustion is thus more efficiently delivered to the slag, where it is needed to sustain the desired reactions occurring there. A second stream of lower velocity oxygen can be delivered through an outermost annulus 84 to react with carbon monoxide gas rising from slag layer 30, thereby adding still more heat to the furnace.

22 Claims, 5 Drawing Sheets

LANCE FOR FUEL AND OXYGEN INJECTION INTO SMELTING OR REFINING FURNACE

The Government of the United States of America has rights in this invention pursuant to Cooperative Agreement No. DE-FC07-89ID12847 awarded by the U.S. Department of Energy.

This application is a division of application Ser. No. 08/000,722 filed Jan. 5, 1993.

FIELD OF THE INVENTION

This invention concerns a process and an apparatus for introducing oxygen and a carbonaceous fuel into a smelting and/or metal refining furnace. In particular, the invention concerns the introduction of oxygen and carbonaceous fuel into the furnace through a lance in such a manner that the volatile matter content of the fuel is combusted in a fashion permitting optimum utilization of the heat of combustion in the smelting or refining operation.

DESCRIPTION OF THE PRIOR ART

It is known that a pneumatic lance device may be used to introduce oxygen and solid materials into a furnace for refining molten metals. The lance may be used to introduce oxygen alone or to introduce both oxygen and solid fuel concurrently. This is common in the refining of ferrous materials such as iron melts to produce steel.

During a typical iron refining process, oxygen alone is delivered to the iron melt, utilizing a pneumatic lance, in order to partially oxidize the carbon in the melt, thereby reducing the carbon content of the iron. The incompletely oxidized carbon rises and escapes from the melt as carbon monoxide. Additional heat of combustion is available if the carbon monoxide is further oxidized to carbon dioxide before the CO escapes from the furnace. It is known to utilize a second stream of oxygen above the melt to oxidize the CO in the vicinity immediately above the melt, thereby capturing the energy released by this reaction.

Typically, in the refining of molten iron, quantities of steel scrap are added to the process. In order to prevent cooling and solidification of the molten bath from the addition of the scrap, it is known to add quantities of solid fuel, commonly carbonaceous material, to the process to create heat. This has been accomplished by utilizing a lance to deliver both oxygen and carbonaceous material to the melt. The carbonaceous material is injected into the molten bath to recarburize the melt, and oxygen is simultaneously injected into the molten bath. The oxidation of the additional carbon and the subsequent secondary oxidation of the resulting carbon monoxide result in the release of sufficient additional energy to maintain the temperature of the melt and to melt the cold scrap additions.

Top-blowing systems have been described for introducing both solid fuel and oxygen to the melt of a metal refining operation. Metz et al., U.S. Pat. No. 4,434,005, issued Feb. 28, 1984, describe a method of introducing carbon and oxygen into the melt of a refining operation by means of a blowing device. Mercatoris, U.S. Pat. No. 4,533,124, issued Aug. 6, 1985, uses a blowing apparatus containing a chamber filled with inert gas to separate the oxygen and the solid material during transport through the apparatus. With these devices and methods, the carbon and the oxygen are not separated after they exit the blowing apparatus. This can lead to premature combustion of the fuel, unless the fuel and oxygen are injected into the melt at very high velocities. Moreover, these devices and methods do not permit the utilization of the carbon or the oxygen for processes or reactions that may be desired in a slag layer on top of the melt. Further, volatile matter in the carbon may be permitted to escape before reaching a location where it can be combusted and the heat of combustion utilized.

SUMMARY OF THE INVENTION

The present invention is a process for combusting carbonaceous material and oxygen in a smelting and/or refining operation, and an apparatus for delivering the carbonaceous material and oxygen to the furnace in which the operation is being performed, that have certain advantages over the prior art processes and apparatus. In the process, the carbonaceous material and the oxygen are introduced from overhead in the form of nearby streams, and a stream of inert gas is interposed between the carbonaceous material and the oxygen streams, thereby preventing corn mingling of the fuel and oxygen during transport. By keeping the carbonaceous material and oxygen separated, premature combustion of the carbonaceous material can be prevented, without having to use such high stream velocities that the carbonaceous material is propelled deep into the melt. By using the lower injection velocity, the carbonaceous material can be made available for smelting reactions such as reducing iron ore to elemental iron, using the carbonaceous material as a reducing agent, or other types of reactions that are desired within the slag layer. By separating the carbonaceous material and oxygen until the carbonaceous material stream is well within the slag layer, but not through it, that is, not reaching the underlying melt, combustible volatile matter in the carbonaceous material can be made to combust in the slag layer, so that the heat of that combustion is better utilized to sustain the reactions occurring in the slag layer and/or the melt.

Carbonaceous material used as fuel generally contains combustible volatile matter. For example, coal used in the reduction of iron ore may contain volatile matter such as hydrogen, which is utilized as a fuel source to generate the necessary heat for the reaction. Examples of other suitable sources of carbonaceous material are coke, graphite, char, and hydrocarbon gases or liquids, (e.g., petroleum products). The carbonaceous material is propelled toward the slag layer with sufficient velocity to prevent substantial devolatilization until the carbonaceous material has penetrated the slag layer. Concurrently, oxygen is also propelled toward the slag layer, and the carbonaceous material and oxygen streams are kept separate during transport to the slag layer by means of the inert gas stream interposed between the oxygen and the carbonaceous material, thus preventing premature oxidation or combustion of the carbonaceous material. By "inert gas" is here meant a gas that; under the conditions of the process, is essentially nonreactive with both the carbonaceous material and the oxygen. Examples of suitable inert gases include nitrogen, argon, carbon dioxide, steam, and off-gas combustion products.

The velocities of the carbonaceous material stream and the oxygen stream, and the distance of separation of the two streams are preferably selected so that the volatile matter in the carbonaceous material is combusted at some point below the surface of the slag layer, but above the surface of the melt. Usually the velocity of each stream will be about Mach 0.75 or higher. As a result of the combustion in the slag layer, at least a portion of the energy released as heat of combustion of the volatile matter is utilized by the smelting or refining operation in the slag layer.

In one embodiment of the invention, the carbonaceous material is introduced in a center stream which is shrouded by the inert gas stream and is thereby separated from the oxygen, which is introduced in the form of at least one outer stream.

A preferred embodiment of the invention utilizes the process in the combined smelting of iron ore and refining of molten iron utilizing particulate coal as the carbonaceous material and argon or nitrogen as the inert gas. The coal is preferably delivered in a stream at a speed of between about Mach 0.75 and about Mach 2, surrounded by the nitrogen or argon stream delivered at about Mach 0.5 to Mach 1.5, and the oxygen outer stream is preferably delivered at a speed of about Mach 0.75 to Mach 2.0. The three streams are injected into a slag layer which is a minimum of about 0.5 meter in thickness, the slag layer resting on top of the molten iron bath.

An especially preferred embodiment of the invention uses a lance to deliver the three streams with the protective inert gas strum being an annular stream (i.e., in the form of a hollow cylinder) having a thickness of about 0.75 to 3.0 millimeters at the point where it exits the lance. The coal and the inert gas are kept separate during the transport to the slag and until the coal has penetrated deep within the slag layer. It is an objective of this process to prevent the volatile matter of the coal from escaping to the furnace atmosphere. It is a further object to combust the volatile matter and to thereby utilize the heat of combustion of the volatile matter to advance the desired chemical reaction or reactions occurring in the slag layer and/or the melt.

Another aspect of the invention concerns a pneumatic lance for delivering the carbonaceous material and oxygen to a furnace in which reactants are heated, in such a manner that the two streams are separated by an inert gas stream, thereby delaying contact of the carbonaceous material and oxygen streams. The lance comprises a central core surrounded by a first annular opening through which the inert gas is ejected and a second annular opening surrounding the first annular opening. Either the oxygen or carbonaceous material can be propelled through the central core and the other through the second annular opening. The central core can be constructed, for example, of pipe having a wall thickness of about 4 to 7 millimeters. Preferably, the carbonaceous material is ejected from the central core, while the oxygen is ejected from the second annular opening at an angle of about 10 to 45 degrees, more preferably about 15 to 20 degrees, from the axis of the carbonaceous material stream. It is preferred that the diameter of the central core be about 20 to 40 millimeters, more preferably about 20 to 30 millimeters; that the width of the first annular opening be about 0.75 to 3 millimeters, more preferably about 0.75 to 1.25, or even 0.9 to 1.1, millimeters; and that the width of the second annular opening be about 19 to 50 millimeters, more preferably about 19 to 25 millimeters.

The lance preferably is comprised of an elongated body member containing inlet and discharge ends for the carbonaceous material, inert gas and oxygen streams. It is preferred that the flow of the carbonaceous material be through the central core, surrounded by the simultaneous flow of the inert gas through the first annular chamber, and the simultaneous flow of the oxygen through the second annular chamber. However, it is possible for the flow of the oxygen to be directed through the central core and the flow of the carbonaceous material to be directed through the second annular chamber. The lance incorporates means for delivering the carbonaceous material to the inlet end of the central core or the second annular chamber, means for delivering the inert gas to the inlet end of the first annular chamber and means for delivering the oxygen to the inlet end of the central core or the second annular chamber, whichever is not connected to the carbonaceous material feed line.

Preferably the lance is equipped with a detachable injection nozzle for the discharge ends of the tubular core, the first annular chamber, and the second annular chamber. The nozzle preferably has a central opening that is of the same approximate size as, and is lined up with, the central core, a ring-shaped opening that is of the same approximate size as, and is lined up with, the first annular opening, and a series of about 6 to 16 dispenser openings lined up with the second annular opening, the openings preferably having a total cross-sectional area of at least about 1,000 square millimeters. The dispenser openings can be cylindrical bores evenly spaced around the second annular opening, each at an angle of about 10 to 45 degrees outward from the central core's axis. The bores have sufficient length to impart direction to the flow of the material, preferably oxygen, being discharged from the second annular opening. It is preferred that the central core be constructed of a removable pipe to permit changing of the core in the event of solids plugging. The nozzle may be designed so that the discharge speed of each of the three streams is subsonic or supersonic.

The lance may optionally be equipped with a third annular chamber surrounding the second annular chamber, the third chamber also having inlet and discharge ends. In this embodiment the lance includes means for delivering oxygen to the third chamber, and preferably it includes means for directing the oxygen flowing out of the third chamber in an outward direction at an angle of about 10 to 30 or 35 degrees from the direction of flow of the other stream of oxygen as it leaves the lance. By use of this version of the lance, a primary stream (or "hard blow") of oxygen can be ejected through the second annulus at a velocity sufficient to penetrate the slag layer to combust incompletely therein volatile matter from the carbonaceous material, while a secondary stream (or "soft blow") of oxygen can be ejected through the third annulus. Carbon monoxide formed from the incomplete combustion in the slag rises, and the secondary oxygen stream provides combustion above or just below the surface of the slag of at least a portion of the released carbon monoxide, thus supplying additional heat to the process. The velocity of the secondary oxygen stream will often be from about Mach 0.70 or 0.75 to about Mach 1.8.

These and other features, aspects, and advantages of the present invention will become better understood with reference to the following description, appended claims, and drawings.

THE DRAWINGS

DETAILED DESCRIPTION AND PREFERRED EMBODIMENT OF THE INVENTION

Figure 1:
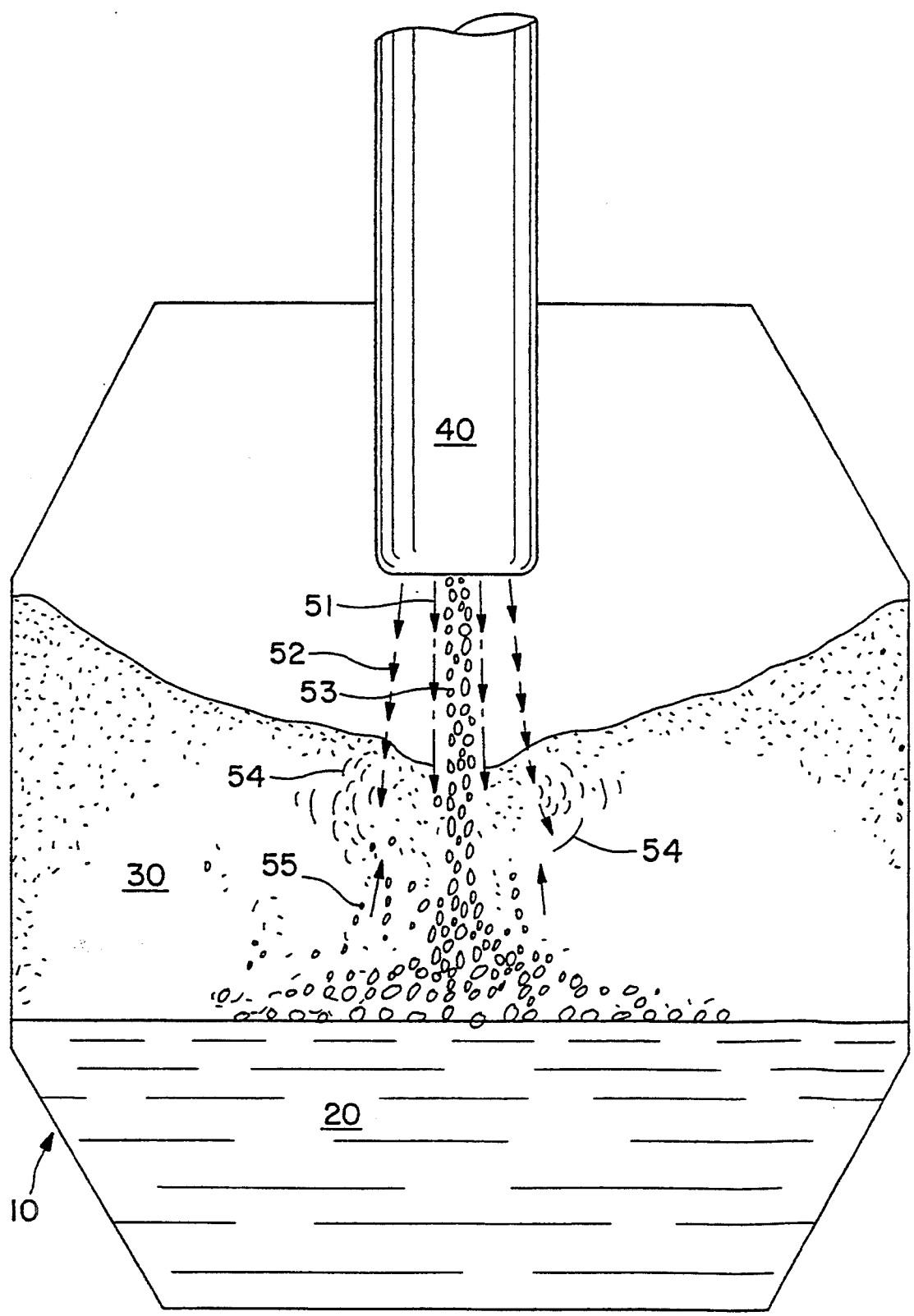
FIG. 1 is a diagram illustrating one embodiment of the process of the invention.

Referring to FIG. 1 of the drawings, a general schematic section of a furnace 10 in which the process of the invention is to occur is shown. This can be any of a number of types of furnaces commonly known to those skilled in the art and used for the refining or smelting of metals and their ores. In the preferred embodiment depicted in FIG. 1, iron ore is being reduced to iron and the resulting iron is being refined.

As shown schematically in FIG. 1, in furnace 10 molten iron 20 is being refined and iron ore is being reduced. A molten foamy slag layer 30 containing the iron ore is resting on the molten iron. Particulate coal 53, containing volatile matter, is propelled toward slag layer 30 as the central stream of a pneumatic lance 40, while oxygen 52 is introduced in the form of an outer annular stream from the lance. The coal 53 and oxygen 52 are kept separate after they exit the lance by means of an annular stream of nitrogen 51. The coal 53 is discharged from the lance at a speed of about Mach 0.75 to Mach 1.2. The oxygen 52 is discharged from the lance at a speed of about Mach 0.5 to Mach 1.5. The nitrogen 51 is discharged from the lance at a speed of about Mach 0.75 to Mach 1.2.

The coal 53, oxygen 52, and nitrogen 51 are injected into the foamy slag layer 30 resting on top of the molten iron 20. The thickness of the slag layer is maintained at at least about 0.5 meter, preferably at least about 1.0 meter.

To maintain the separation of the carbon 53 and oxygen 52, the thickness of the annular nitrogen stream 51 is maintained at about 0.7 to 1.2 millimeters, at the point where it exits lance 40.

The slag layer 30 thickness, the velocities of the coal 53, oxygen 52, and nitrogen 51, and the thickness of the annular nitrogen shroud 51, are maintained so that at least a portion of the volatile matter in the coal remains in the coal stream until it has penetrated into the slag layer. Similarly, contact between a substantial portion of the coal 53 and the oxygen 52 is delayed until the coal 53 has penetrated into the slag layer. As a result, the volatile matter 55 separates from the coal at some point in the slag layer 30 and begins to rise. It is intercepted by the oxygen stream 52 and is combusted before reaching the surface of the slag layer 30. The resulting energy, as heat of combustion 54 of the volatile matter, is available to the reaction or reactions occurring in the slag layer 30, or for use in maintaining the temperature of the overall process.

Figure 2A:
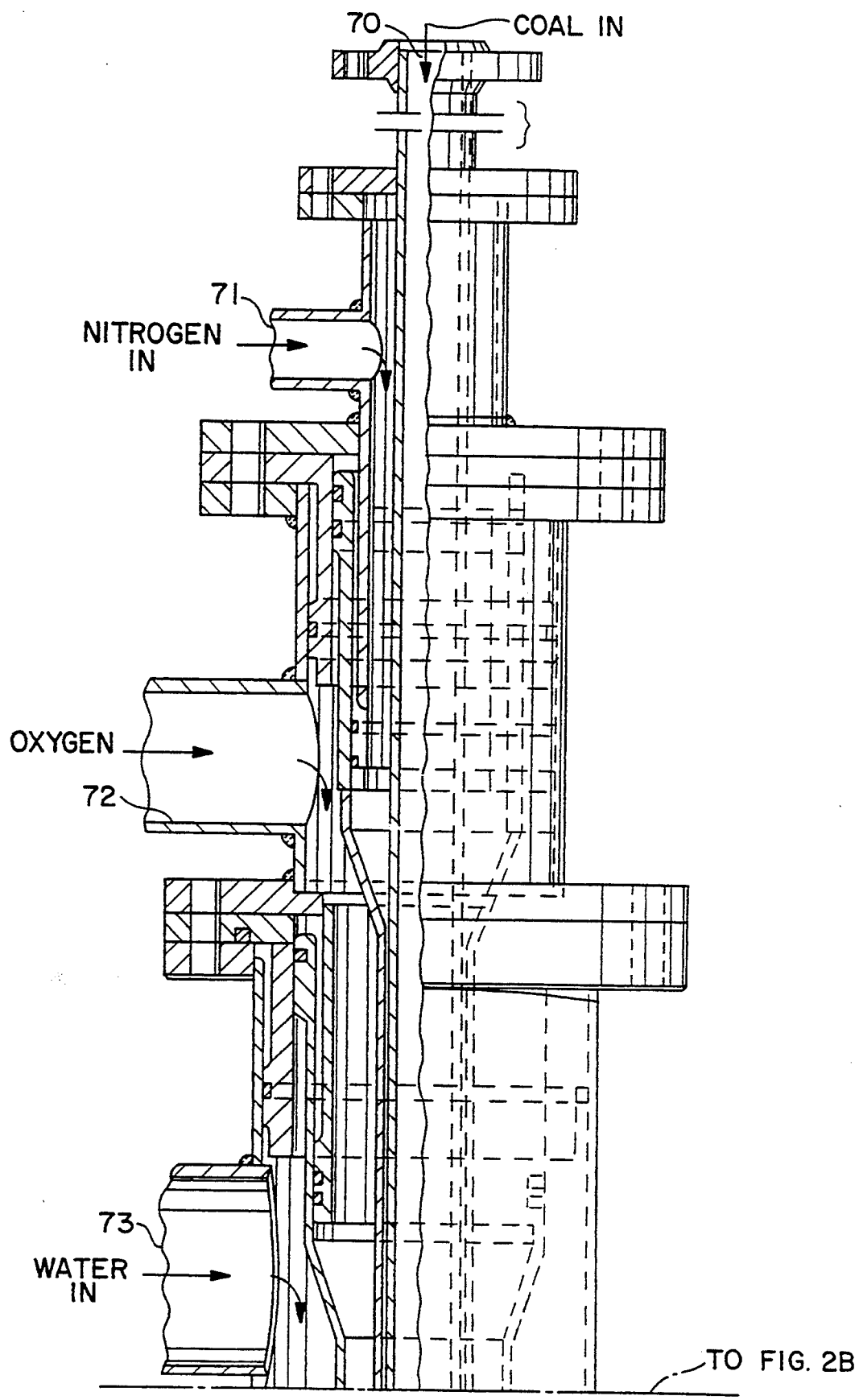
FIG. 2A is a longitudinal axial section of the inlet portion of a lance embodying features of the present invention.
Figure 2B:
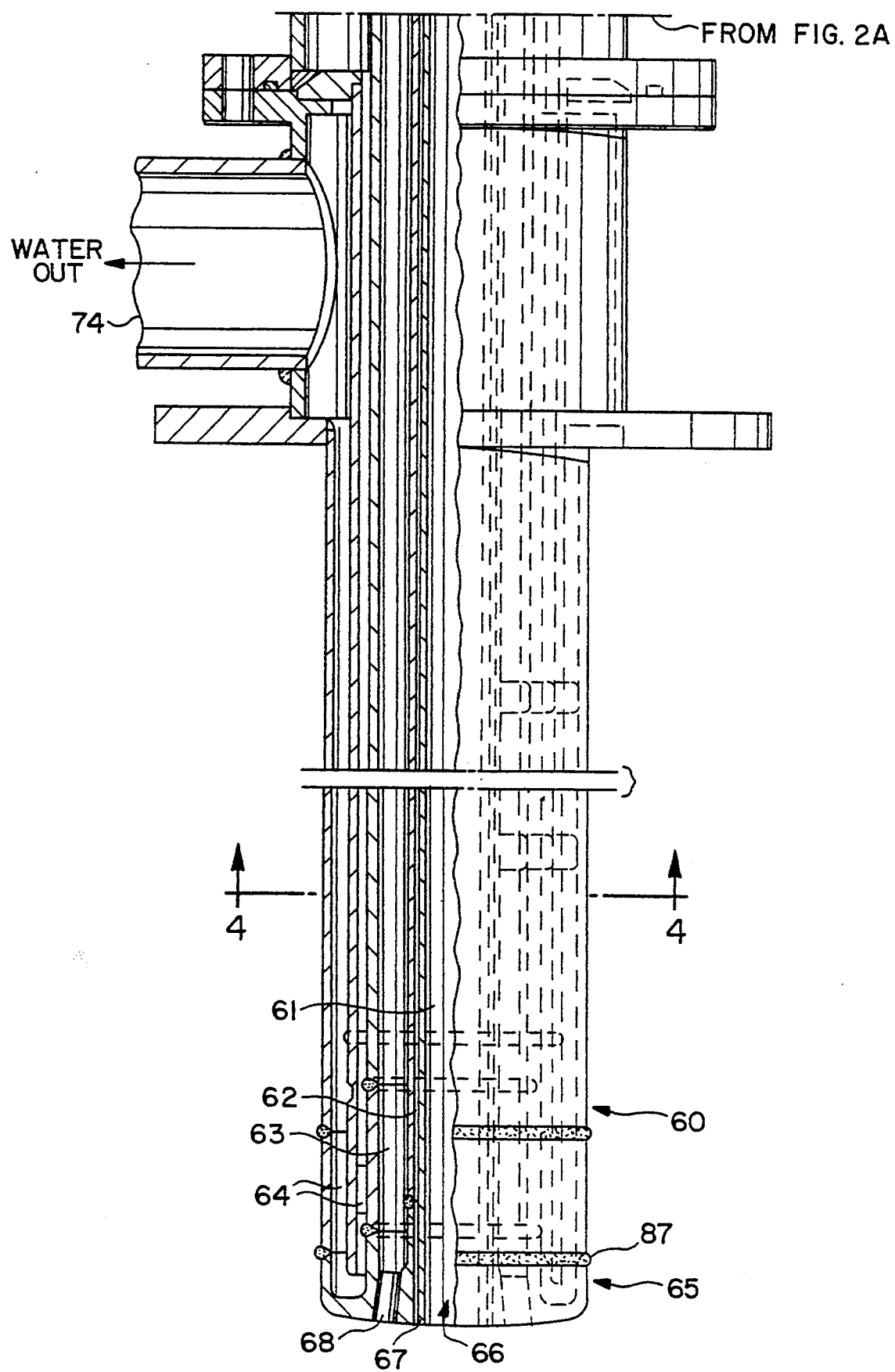
FIG. 2B is a longitudinal axial section of the discharge portion of the lance depicted in FIG. 2A.
Figure 3:
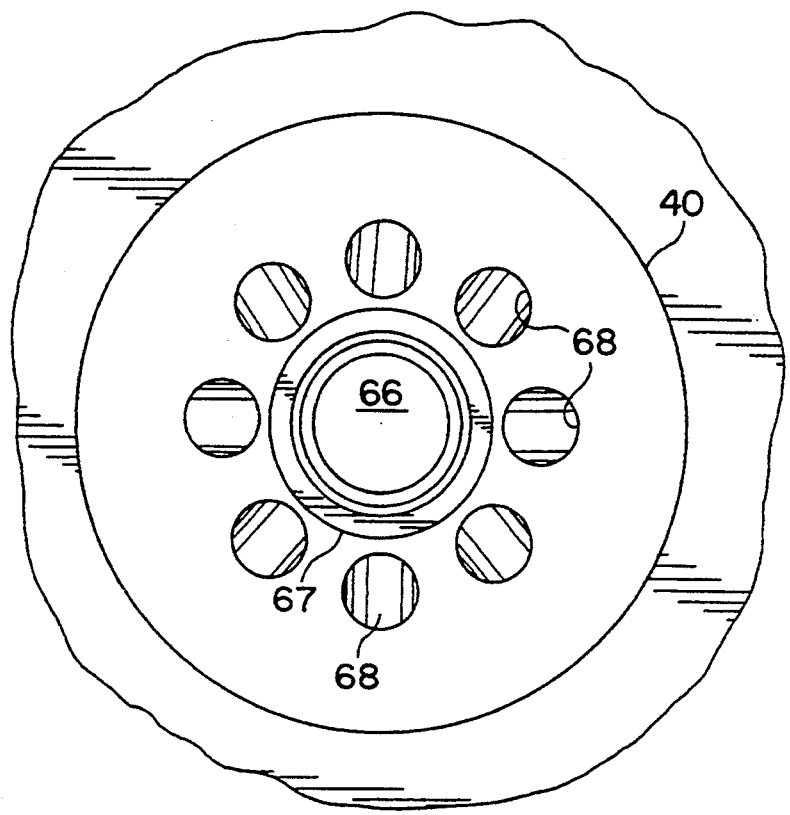
FIG. 3 is an end view of the nozzle end of the lance of FIGS. 2A and B.
Figure 4:
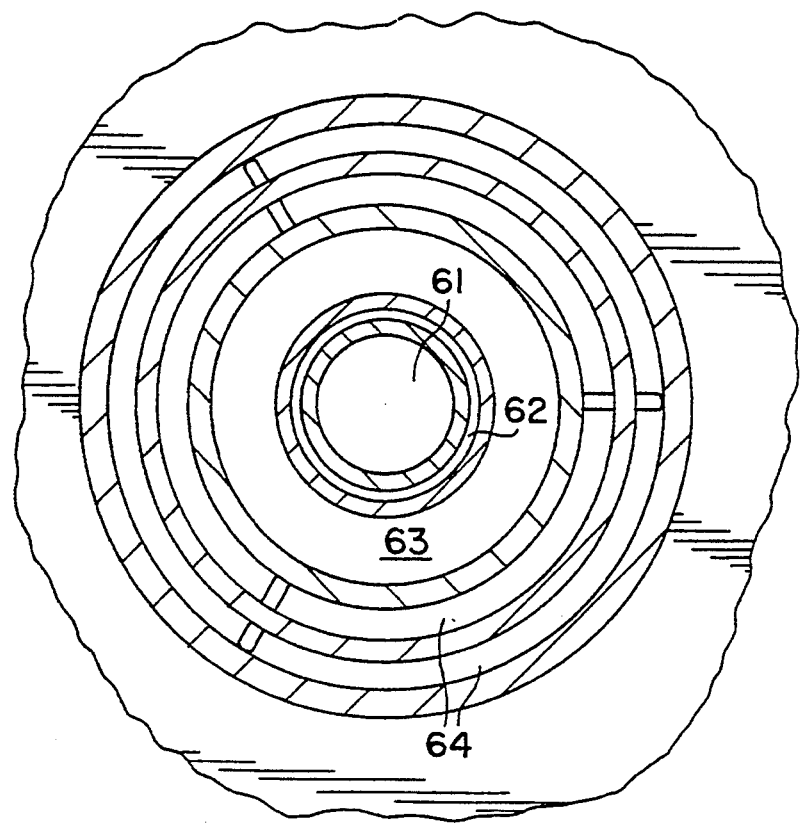
FIG. 4 is a cross-sectional view of the body of the lance of FIGS. 2A and B.

Referring now to FIGS. 2, 3, and 4, lance 60 is designed to be used to deliver the carbonaceous material, oxygen, and inert gas to the slag layer. The lance consists of an elongated body with a central core 61, which is surrounded by a first annular chamber 62 and a second annular chamber 63. The central core 61 is used for the delivery of the carbonaceous material and the second annular chamber 63 is used to deliver the oxygen. The oxygen stream is delivered at an angle of about 15 to 20 degrees from the axis of the carbonaceous material stream. The first annular chamber 62 is used to deliver the inert gas, which serves to separate the carbonaceous material and oxygen during transport through the lance.

The central core 61 is tubular and can be made of steel pipe with an inside diameter of about 25 to 30 millimeters, and a wall thickness of about 4 to 7 millimeters. The central tubular core 61 is made removable, permitting the tube to be changed in the event of solids plugging. The width of the first annular chamber 62 is about 0.9 to 1.1 millimeters. The second annular chamber 63 is about 19 to 25 millimeters in width. The spatial arrangements of the chambers can be viewed in FIG. 4, which is a cross-sectional view of the elongated body taken along the line 4—4 in FIG. 2B. The lance 60 is provided with a water cooling chamber 64 surrounding the second annular opening 63.

The lance 60 incorporates inlet means for the carbonaceous material, the oxygen, the inert gas, and the water. In the preferred embodiment shown in FIG. 2, the coal inlet means 70 is to the central core, the nitrogen inlet means 71 is to the first annular chamber, the oxygen inlet means 72 is to the second annular chamber, and the water inlet means 73 is to the enclosed chamber 64 surrounding the second annular chamber. Water cooling chamber 64 is equipped with a water discharge means 74.

The discharge ends of the tubular central core 61, the first annular chamber 62, and the second annular chamber 63 are located in a detachable and replaceable nozzle 65. The nozzle is welded to the lance body 60. It can be replaced by cutting radially through the lance 60 at or slightly above the weld 87 and then welding the new nozzle to the resulting cut end of the lance.

An end view of the nozzle is shown in FIG. 3. In this arrangement, the nozzle contains a central opening 66 that corresponds with and communicates with the central tubular core 61. A ring-shaped opening 67 corresponds with and communicates with the first annular chamber 62. The discharge of the contents of the second annular chamber 63 is to a series of dispenser openings 68 that communicate with the second annular chamber 63. These dispenser openings 68, numbering about 8, are evenly spaced around the second annular chamber 63 and provide a total open area of at least about 1000 square millimeters. Preferably, the dispenser openings 68 are cylindrical bores through the nozzle with sufficient length to provide direction to the flow of oxygen from the openings. More preferably, the cylindrical bores serving as the dispenser openings 68 are about 32 to 65 millimeters in length and have an axis that is angled from about 15 to 20 degrees outwardly from the core's axis. They have diameters of about 15 to 17 millimeters.

Figure 5:
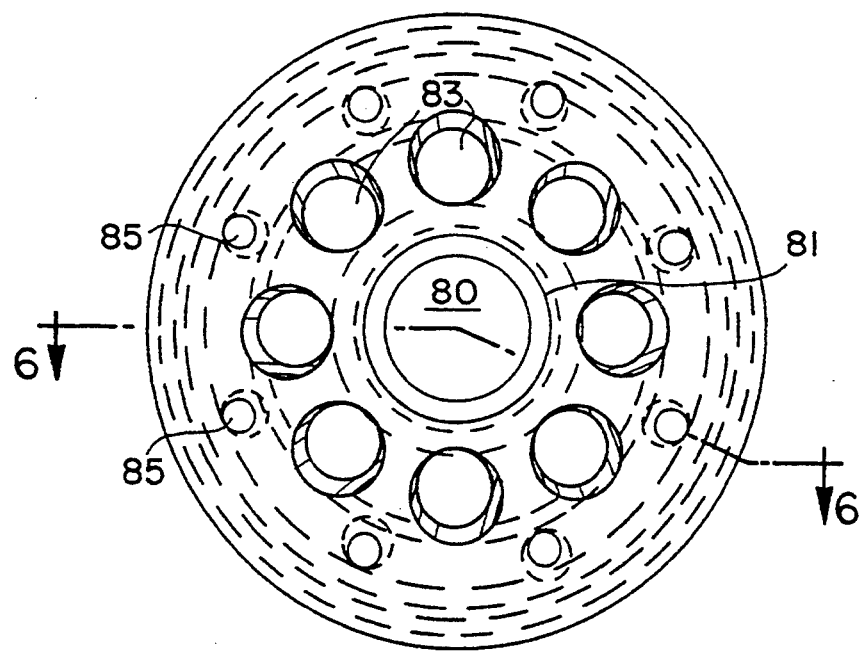
FIG. 5 is a longitudinal axial section of the discharge portion of another version of a lance embodying features of the present invention.
Figure 6:
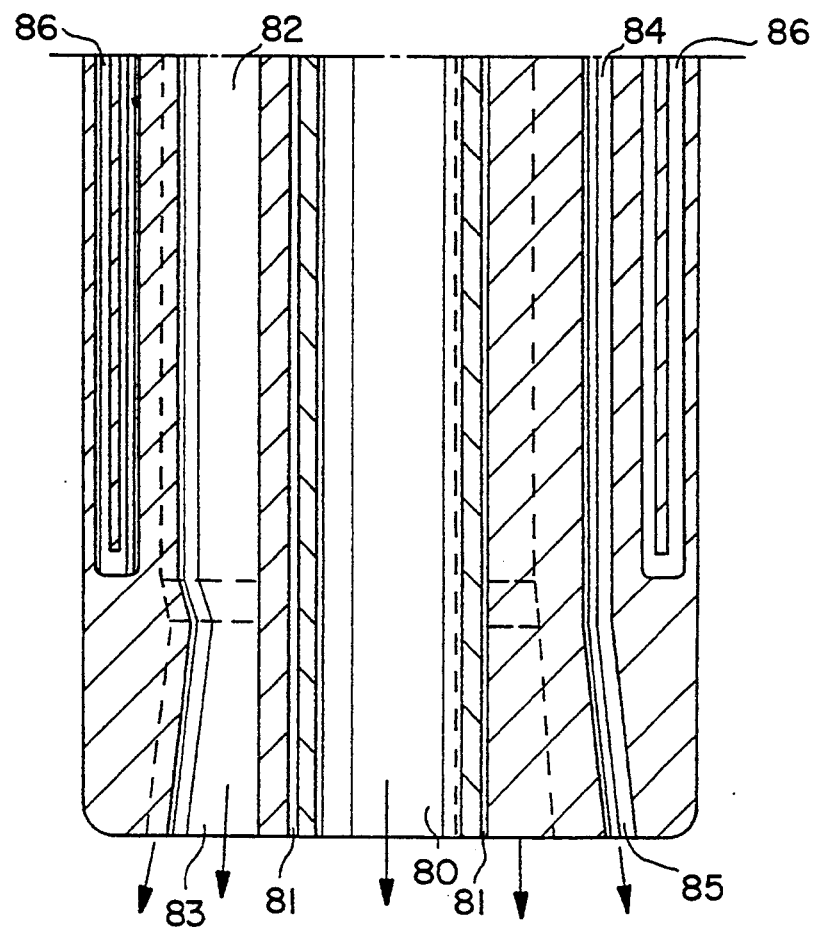
FIG. 6 is an end view of the nozzle end of the lance of FIG. 5.

In FIGS. 5 and 6 is depicted the replaceable tip of a modified version of the lance of FIGS. 2–4, designed to permit the simultaneous introduction of both hard blow and soft blow oxygen, together with the particulate coal. The coal is delivered through central passage 80, for example at a velocity of about Mach 0.75 to 2.0. A thin shroud of inert gas, preferably nitrogen or argon, is forced out of annular chamber 81, for example at a velocity of about Mach 0.5 to 1.5. A hard blow of oxygen, for example having a velocity of about Mach 0.75 to about 1.8 or 2.0, is discharged from annular chamber 82. Dispenser holes 83 angle the hard blow oxygen away from the center axis by about 15 degrees. Soft blow oxygen, for example at a velocity of about Mach 0.5 to 1.0, is delivered through annular chamber 84. Dispenser openings 85 direct the secondary oxygen outwardly from the hard blow oxygen at an angle of about 25 degrees (measured from the direction of flow of the hard blow oxygen). Cooling water is circulated through U-shaped annular chamber 86, for example at a flow rate of about 150 to 180 $NM^3/hr$.

The lance may be poised above the surface of the slag layer a distance of, say, about 0.20 to 0.50 meters, measured from the bottom tip. The higher velocity oxygen ejected through nozzles 83 primarily serves to penetrate into the slag layer, in which it then reacts with volatile matter released from the coal. The lower velocity oxygen ejected through nozzles 85 serves primarily to react with carbon monoxide gas rising from the slag. Generally, more soft blow oxygen is needed than hard blow; e.g., the volume ratio of soft to hard will be in the range of about 1/1 to 1.2/1. The ratio of the total area of nozzle openings for the hard blow oxygen to the total area of nozzle openings for the soft blow oxygen may, for example, be within the range of about 1/1 to 0.9/1.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. In a lance comprising means for simultaneously introducing respective streams of carbonaceous material and oxygen into a furnace in which reactants are heated and in which furnace carbonaceous material and oxygen will react to release a heat of combustion, the improvement comprising means for simultaneously delivering a stream of an inert gas interposed between the stream of carbonaceous material and the stream of oxygen, whereby contact between the stream of carbonaceous material and the stream of oxygen is delayed.

2. A lance as in claim 1, wherein the introducing means comprises a central core through which one of the stream of oxygen or the stream of carbonaceous material is ejected, the delivering means comprises a first annular opening surrounding the central core through which the stream of inert gas is ejected, and the introducing means further comprises a second annular opening surrounding the first annular opening through which the other one of the stream of oxygen or the stream of carbonaceous material is ejected.

3. A lance as in claim 2, wherein the introducing means ejects the stream of carbonaceous material from the central core.

4. A lance as in claim 3, wherein the stream of carbonaceous material has an axis and the introducing means ejects the stream of oxygen at an angle of about 10 to 45 degrees from the axis of the stream of carbonaceous material.

5. A lance as in claim 4, wherein the diameter of the central core is about 20 to 40 mm., the width of the first annular opening of the inert gas delivering means is about 0.75 to 3 mm., and the width of the second annular opening is about 25 to 55 mm.

6. A lance as in claim 5, wherein the central core is formed by a pipe having a wall thickness of about 4 to 7 mm.

7. A lance for simultaneously introducing respective streams of carbonaceous material, inert gas, and oxygen into a furnace, the lance comprising an elongated body member having a central tubular core with inlet and discharge ends for one of the stream of oxygen and the stream of carbonaceous material, a first annular chamber surrounding the tubular core and having inlet and discharge ends for the stream of inert gas, and a second annular chamber surrounding the first annular chamber and having inlet and discharge ends for the other one of the stream of carbonaceous material and the stream of oxygen.

8. A lance as in claim 7, further comprising means for delivering either carbonaceous material or oxygen to the inlet end of the central tubular core.

9. A lance as in claim 7, further comprising means for delivering carbonaceous material to the inlet end of the central tubular core.

10. A lance as in claim 7, further comprising means for delivering carbonaceous material to the central tubular core, means for delivering inert gas to the first annular chamber, and means for delivering oxygen to the second annular chamber.

11. A lance as in claim 8, wherein the discharge ends of the tubular core, the first annular chamber, and the second annular chamber are located in a detachable injection nozzle having a central opening corresponding to and communicating with the tubular core, a ring-shaped opening corresponding to and communicating with the first annular chamber, and a series of dispenser openings communicating with the second annular chamber.

12. A lance as in claim 11, wherein the dispenser openings are evenly spaced around the second annular chamber.

13. A lance as in claim 12, wherein the dispenser openings number at least 6.

14. A lance as in claim 11, wherein the central core has an axis and at least some of the dispenser openings are cylindrical bores having respective axes that form an angle of about 10 to 45 degrees outwardly from the axis of the central core.

15. A lance as in claim 11, wherein the length of at least some of the cylindrical bores is a minimum of about 32 mm.

16. A lance as in claim 8, wherein the central tubular core comprises a removable cylindrical member.

17. A lance as in claim 10, further comprising:
a third annular cheer surrounding the second annular chamber, said third annular chamber having inlet and discharge ends; and
means for delivering oxygen to the inlet end of the third chamber.

18. A lance as in claim 17, wherein the discharge ends of the tubular core, the first annular chamber, and the second annular chamber are located in a detachable injection nozzle having a central opening corresponding to and communicating with the tubular core, a ring-shaped opening corresponding to and communicating with the first annular chamber, and a series of dispenser openings communicating with the second annular chamber; the tubular core has an axis at least some of the dispenser openings are cylindrical bores having respective axes that form an angle of about 10 to 45 degrees outwardly from the axis of the tubular core; and the discharge end of the third annular chamber includes means for directing a stream of oxygen outwardly at an angle of about 10 to 30 degrees from the axes of the dispenser openings that are in communication with said second annular chamber.

19. A lance for simultaneously introducing respective streams of carbonaceous material, inert gas, and oxygen into a furnace, the lance comprising a central core and means for supplying carbonaceous material to the central core; a first annular chamber surrounding the central core and means for supplying inert gas to the first annular chamber; and a second annular chamber surrounding the first annular chamber and means for supplying oxygen to the second annular chamber.

20. A lance for simultaneously introducing respective streams of carbonaceous material, inert gas, and oxygen into a furnace, the lance comprising:
 an elongated body with a discharge end;
 a tubular core located in approximately the center of the body, having an axis and an inner diameter of about 25 to 30 mm. and having a wall thickness of about 4 to 7 mm.;
 a first annular chamber having an axis and a width of about 0.9 to 1.1 mm. surrounding the tubular core;
 a second annular chamber having a width of about 19 to 25 mm. surrounding the first annular chamber;
 means for supplying carbonaceous material to the central tubular core;
 means for supplying inert gas to the first annular chamber; and
 means for supplying oxygen to the second annular chamber;
 wherein the discharge end of the elongated body includes a detachable nozzle having a central opening corresponding to and communicating with the tubular core, a ring-shaped opening corresponding to and communicating with the first annular opening, and a series of about 6 to 10 dispenser openings, each having a diameter of about 15 to 17 mm., evenly spaced around the nozzle, said dispenser openings being cylindrical bores communicating with the second annular chamber, the axis of each said cylindrical bore being formed at an angle of about 15 to 20 degrees outwardly from the axis of the tubular core.

21. A lance as in claim 20, further comprising:
 a third annular chamber surrounding the second annular chamber, said third annular chamber having inlet and discharge ends; and
 means for delivering oxygen to the third chamber.

22. A lance as in claim 21, wherein the discharge end of the third annular chamber includes means for directing a stream of oxygen outwardly at an angle of about 10 to 30 degrees from the axes of the dispenser openings that are in communication with said second annular chamber.

* * * * *

UNITED STATES PATENT AND TRADEMARK OFFICE
CERTIFICATE OF CORRECTION

PATENT NO. : 5,374,297
DATED : December 20, 1994
INVENTOR(S) : MARK R. SCHLICHTING It is certified that error appears in the above-indentified patent and that said Letters Patent is hereby corrected as shown below:

COLUMN 2

Line 22, "corn mingling" should read --commingling--.
Line 59, "that;under" should read --that, under--.

COLUMN 3

Line 54, "from-the" should read --from the--.

COLUMN 5

Line 7, "and" (second occurrence) should be deleted.

COLUMN 6

Line 21, "4—4" should read --4--4--.

COLUMN 8

Line 52, "cheer" should read --chamber--.
Line 65, "axis at" should read --axis; at--.

Signed and Sealed this

Eighth Day of August, 1995

Attest:

BRUCE LEHMAN

*Attesting Officer*          *Commissioner of Patents and Trademarks*